LOW JITTER WEB AND TAPE DRIVE

Filed Nov. 12, 1965 5 Sheets-Sheet 1

Inventors:
JAMES F. DELANY &
CARL LAUXEN

BY Edward J Norton
Attorney

LOW JITTER WEB AND TAPE DRIVE

Inventors:
JAMES F. DELANY &
CARL LAUXEN
BY Edward J. Norton
Attorney

June 11, 1968 J. F. DELANY ET AL 3,387,758

LOW JITTER WEB AND TAPE DRIVE

Filed Nov. 12, 1965 5 Sheets-Sheet 3

Inventors:
JAMES F. DELANY &
CARL LAUXEN

BY Edward J. Norton
Attorney

Inventors:
JAMES F. DELANY &
CARL LAUXEN
BY Edward J Norton
Attorney

LOW JITTER WEB AND TAPE DRIVE

Inventors:
JAMES F. DELANY &
CARL LAUXEN
BY Edward J. Norton
Attorney

United States Patent Office 3,387,758

Patented June 11, 1968

3,387,758

LOW JITTER WEB AND TAPE DRIVE

James F. Delany, Burlington, and Carl Lauxen, Haddonfield, N.J., assignors to Radio Corporation of America, a corporation of Delaware Filed Nov. 12, 1965, Ser. No. 507,319
10 Claims. (Cl. 226—108)

ABSTRACT OF THE DISCLOSURE

There is disclosed a tape driving apparatus in which a tape to be driven is passed over two spaced drive rollers; each being driven at the same peripheral speed. Each drive roller has a pulley on it, and a belt passes over and around the two pulleys. The belt, and, therefore, the drive rollers and tape, is driven by a capstan around which the belt is partially wrapped by a pressure roller that presses against the belt without pinching the belt against the capstan.

This invention relates to web and tape drives, and particularly to a low jitter drive means for tape, such as magnetic tape, employed for recording and/or playback.

When recording on tape and when playing back a recording, the recording tape should be driven at a constant speed past the recording and playback heads. Any variation in this speed is referred to as jitter. If recording tape is pulled or driven by a capstan that is in contact with the tape, as in conventional practice, the tape will stretch varying amounts and a proportional jitter will result in the tape. The jitter may not be enough to make it objectionable or even noticeable in some applications, but in other applications the jitter must be much less to be acceptable, as, for example, in the case of frequency spectrum analysis of signals.

An object of the invention is to provide improved means for driving recording tape.

A further object of the invention is to provide an improved low jitter drive means for recording tape.

A further object of the invention is to provide an improved multi-speed drive for recording tape.

A still further object of the invention is to provide an improved means for driving an elongated web, which may be a belt, without pinching the web.

In accordance with one embodiment of the invention the recording tape is a continuous loop of tape which is supported by two spaced driving rollers and by an air guide that may be adjusted to adjust the tension of the tape. The two rollers are driven at the same speed, and the tape tension is made great enough so that there is no slippage of the tape on the rollers. As a result, the tape is driven at a constant speed between the rollers, there being no variation in tape tension.

The two driving rollers are driven by a belt which is driven by a capstan held in contact with the belt by a pressure roller. The pressure roller is positioned so that it does not pinch the belt against the capstan whereby distortion of the belt is avoided. The capstan is driven by a constant speed motor.

The invention will be described in detail with reference to the accompanying drawing in which.

Figure 1:
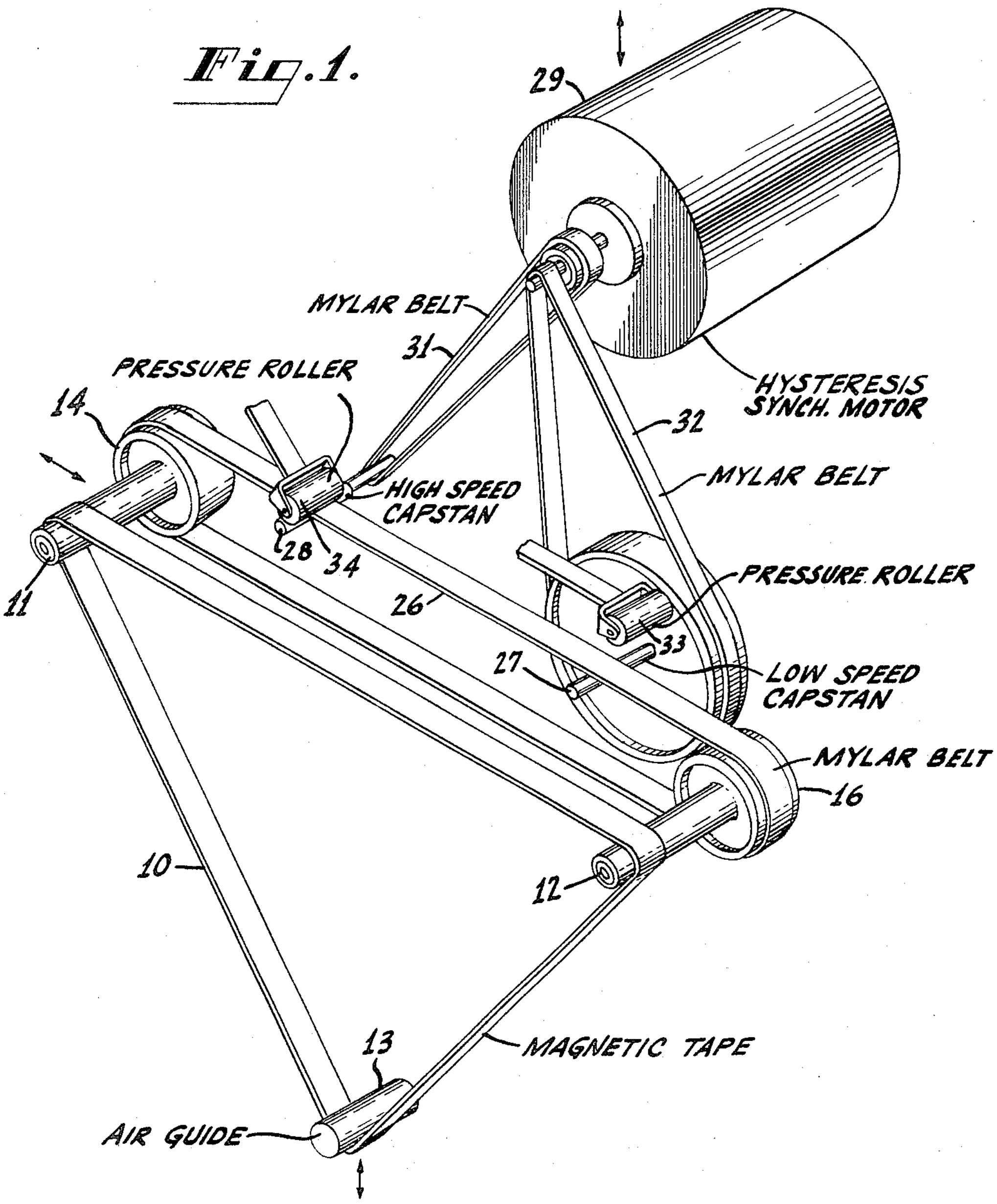
FIG. 1 is a schematic diagram of one embodiment of the invention.
Figure 2:
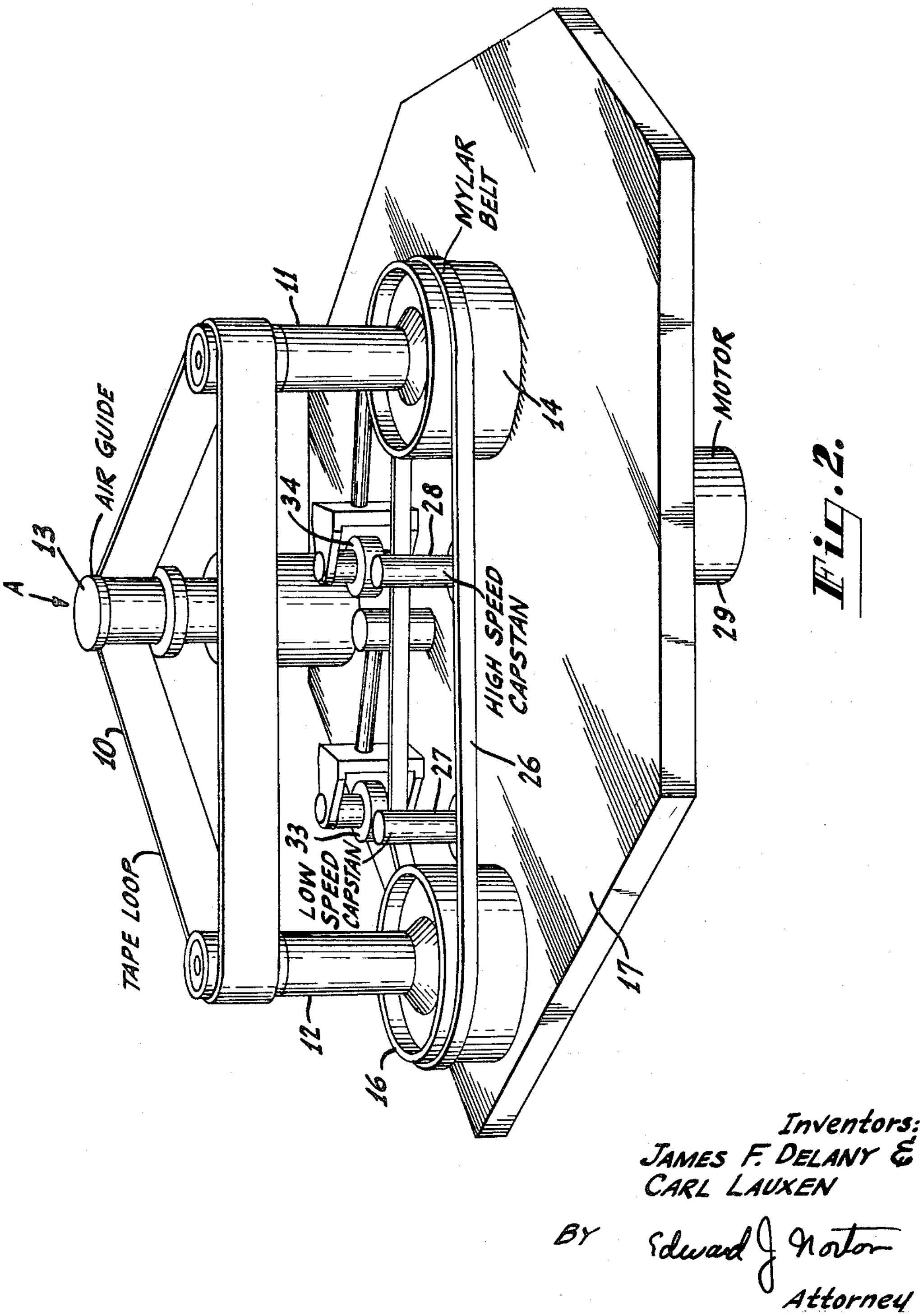
FIG. 2 is a view in perspective illustrating a mechanical construction of the embodiment shown in FIG. 1.
Figure 3:
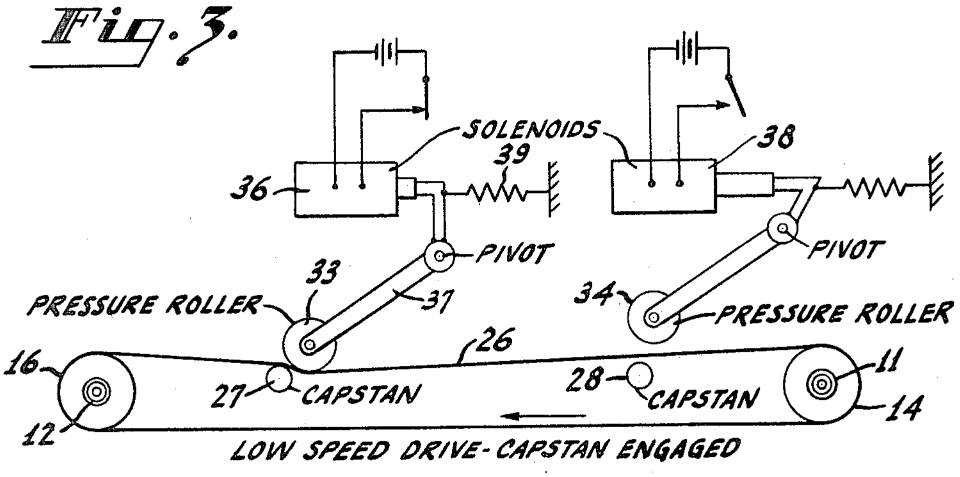
FIG. 3 is a schematic diagram showing the two speed drive used in the embodiment of FIGS. 1 and 2, and showing the relation of the pressure roller to the driving capstan for low speed drive.
Figure 3A:
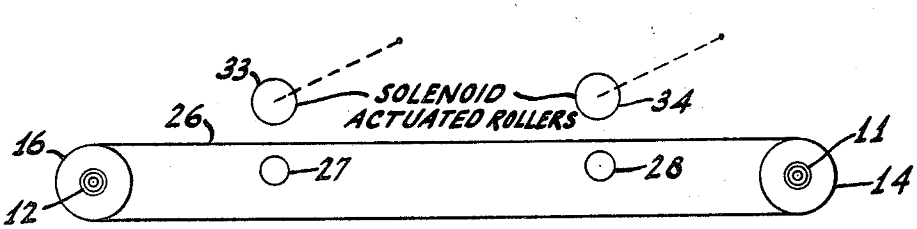
Figure 3B:
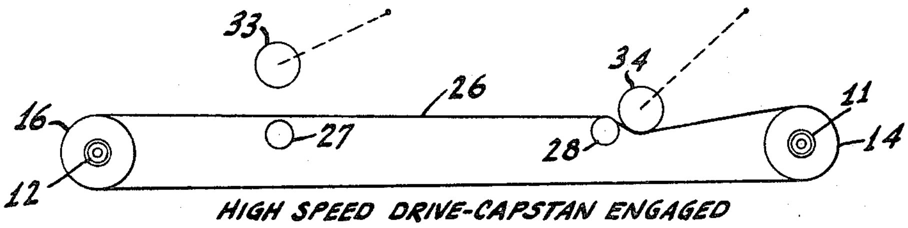
Figure 4:
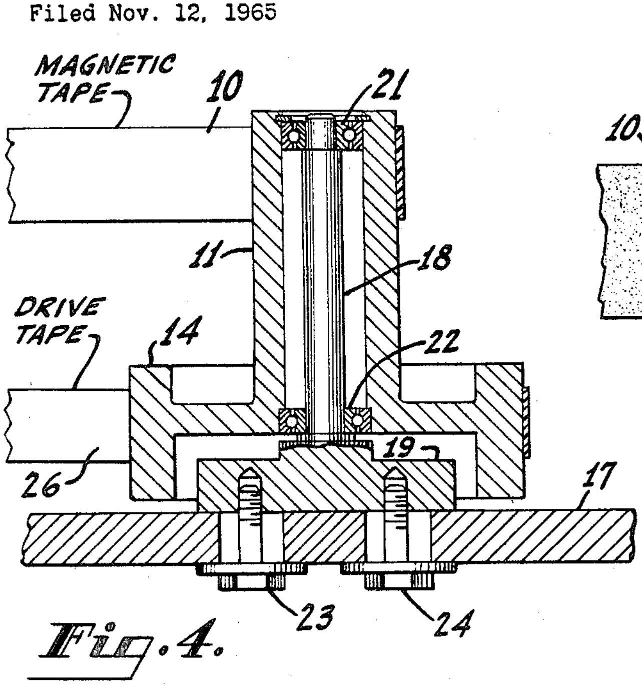
Figure 5:
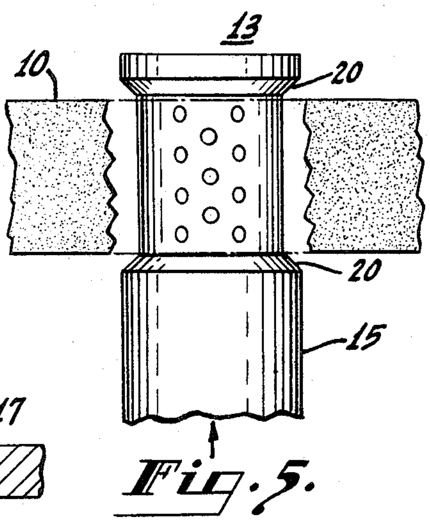
Figure 6:
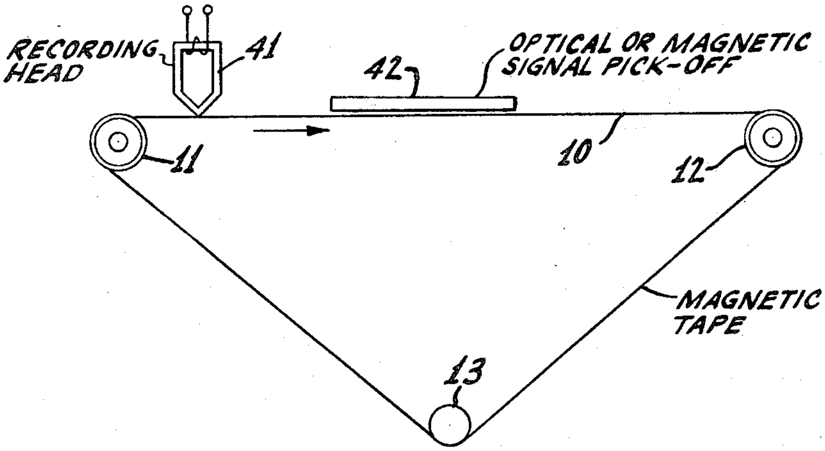
Figure 7:
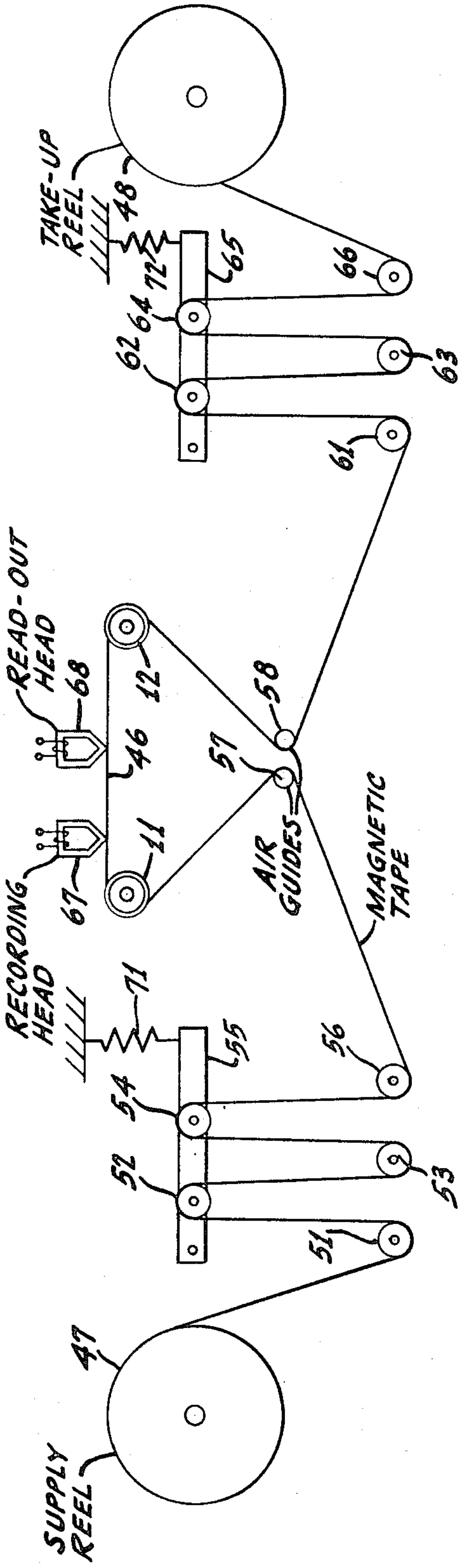

FIG. 3*a* is a schematic diagram illustrating the two speed drive in neutral or non-driving condition;

FIG. 3*b* is a schematic diagram illustrating the two speed drive in the condition for high speed drive;

FIG. 4 is a view in cross-section showing the mounting of one of the pulley-roller units in the embodiment of FIGS. 1 and 2;

FIG. 5 is a view of the air guide shown in FIGS. 1 and 2;

FIG. 6 is a schematic diagram illustrating the relation of a recording head and a signal pick-off head to the recording tape in one application of the invention; and FIG. 7 is a schematic diagram that illustrates an application of the invention using an open loop tape.

In the several figures, like parts are indicated by similar reference characters.

Refer to FIGS. 1, 2 and 3. First, note that the loop of magnetic tape 10 shown in this embodiment is illustrated in the vertical plane in FIG. 1 and in the horizontal plane in FIG. 2. This is merely for convenience in illustration. The apparatus may be operated with the tape loop in either plane. In the example being described, the length of the magnetic tape in the loop is 25 inches.

The tape loop 10 is supported by drive rollers 11 and 12, and by an air guide 13. In the example being described, the drive rollers 11 and 12 are integral with pulleys 14 and 16, respectively, and the pulley diameter is three times that of the roller. Specifically, the rollers 11 and 12 are each one inch in diameter, and the pulleys 14 and 16 are each three inches in diameter. As shown in FIG. 2, the roller-pulley units 11, 14 and 12, 16 and the air guide 13 are supported on a base plate 17.

The roller-pulley unit 11, 14 may be mounted on the base 17 as illustrated in FIG. 4. The unit 11, 14 fits over a shaft 18 which is supported by a base 19. The shaft 18 carries roller bearings 21 and 22 which support the unit 11, 14. The base 19 is secured to the base 17 by screws 23 and 24 which pass through slots in the base 17. Before tightening the screws 23 and 24, the unit 11, 14 may be positioned with respect to the base for the purpose of adjusting the tension of a drive belt 26 which passes over the pulleys 14 and 16. It will be noted that the drive belt tensioning is independent of the magnetic tape tensioning. The pulley 14 is crowned to prevent the flat belt 26 from running off the pulleys. The roller-pulley unit 12, 16 also may be mounted on the base 17 as shown in FIG. 4 through this unit need not be adjustable with respect to the base 17.

The air guide 13 is of conventional construction as illustrated in FIG. 5. In FIG. 5 it is shown as it appears in FIG. 2 looking in the direction of the arrow A in FIG. 2. A tube 15 closed at the upper end has air blown into it as indicated by the arrow in FIG. 5. The air flows out of holes in the side of the tube facing the recording tape so that the tape is held out of contact with the tube 15. The tube 15 may be reduced in diameter at the location opposite the tape to provide guide edges 20 for the tape. However, these guide edges are not necessary because the tape loop is held in position in a conventional manner by providing a crown on the driving roller 11 at the roller surface under the belt. The air guide 13 can be adjustably mounted on the base 17 in the same manner as the roller-pulley unit 11 and 14, the adjustable mounting of which is illustrated in FIG. 4.

One of two capstans 27 and 28 drives the belt 26, thus driving the pulleys 14 and 16 (which are of the same diameter), and driving the recording tape supporting rollers 11 and 12. Thus, the rollers 11 and 12 are driven at the same angular speed, and since they are of the same diameter, they are driven at the same peripheral speed. In the present example, each of the capstans 27 and 28 is one-half inch in diameter.

The capstans 27 and 28 are driven by a constant speed motor 29 which may be a hysteresis synchronous motor driven from a 60 cycle power line. In the embodiment being described, it is desired to drive the recording tape at either one of two selected speeds, one speed being fifty times as great as the other. In the example illustrated, the capstan 28 is driven at the high speed by a belt 31 to drive the magnetic tape at the high rate of fifty inches in three seconds in the present example. The capstan 27 is driven at the low speed by a belt 32 to drive the magnetic tape at the rate of one inch in three seconds in the present example. The driving and driven pulleys engaged by the belts 31 and 32 are of the proper relative diameters to make the speed ratio of the capstans fifty to one. The speeds referred to are the peripheral speeds of the capstans, which in the present example, are also the required linear speeds of the recording tape.

The larger pulleys engaged by the belts 31 and 32 respectively, are crowned to prevent the flat belts from running off the pulleys. The motor 29, as indicated in FIG. 2, is mounted on the underside of the base plate 17, as are the pulleys driving the capstans. The motor is adjustably mounted so that it may be moved in a direction to adjust the tension of the belts 31 and 32 (FIG. 1).

In the embodiment being described, the driving belts 31, 32 and 26 are flat seamless Mylar belts. Mylar belts have very little compliance so that any jitter introduced by belt stretch is very small. These Mylar belts are sold by the Kinelogic Corp., 29 S. Pasadena Ave., Pasadena, Calif. If it is desired to reduce the small amount of jitter still further, the driving belts may be stainless steel belts, the steel being one mil thick for example. When the driving belt 26 is of steel, the pressure rollers described below preferably have a surface of hard rubber or other compliant material so that the belt does not tend to slide along the axis of the pressure roller.

The capstans 27 and 28 are provided with associated pressure rollers 33 and 34, respectively, which may move against the belt 26 to place it in contact with the selected capstan. In the present example, the diameters of the pressure rollers are twice the diameters of the capstans.

In the schematic diagram of FIG. 3, the location of the parts in general appears as in FIG. 2 looking down on the apparatus. As shown in FIG. 3, the low speed capstan 27 is caused to drive the belt 26 by energizing a solenoid 36. This causes an arm 37 carrying pressure roller 33 to swing about a pivot point and force roller 33 against the belt 26 so as to partially wrap the belt 26 around capstan 27. Thus the belt 26 is driven at low speed by the capstan 27. The belt 26 is not in contact with capstan 28 since the controlling solenoid 38 is not energized.

As illustrated in FIG. 3*a*, the belt 26 is not in contact with either capstan until one of the pressure rollers is forced against the belt 26.

FIG. 3*b* illustrates the high speed drive condition. The solenoid 38 is now energized so that pressure roller 34 partially wraps the belt 26 around the high speed capstan 28. The solenoid 36 is not energized, and the roller 33 is pulled away from the belt 26 by a spring 39 (FIG. 3).

Attention is directed to the fact that the pressure rollers 33 and 34 never pinch the belt 26 against a capstan. That is, a pressure roller is never moved into a position where it would make contact with its capstan except for the belt thickness separating the two. Since the belt 26 is never pinched between the pressure roller and the capstan, the belt is never deformed by pinching, and thus one source of drive jitter is avoided.

The above-described capstan and pressure roller drive is useful for drives other than the belt drive illustrated. For example, a web such as paper used in an electrophotographic process may be driven directly by this combination of a capstan and a pressure roller that partially wraps the paper around the capstan but does not pinch the paper against the capstan. In such a drive for a web of paper, the paper may be taken off a supply reel, fed over a guide roller, then over the capstan (between capstan and pressure roller) and over another guide roller, and eventually to a take-up reel. Suitable means is provided for tensioning the paper passing over the capstan.

From the foregoing description it will be seen that the recording tape 10 is driven by its rolling contact with two drive rollers 11 and 12. The tension of the tape is adjusted so that there is no tape slippage on the rollers 11 and 12. Any tendency for tape slippage is reduced by the fact that there is substantial wrap-around of the tape 10 on the two driving rollers. In the example illustrated, the total wrap-around is about 270 degrees. By driving the two rollers 11 and 12 at the same constant peripheral speed, the tape is driven without any tape stretch introduced by the drive, and the only jitter introduced is that caused by any departure from said constant peripheral speed. Such departure is very small in the embodiment described, with the result that the recording tape is driven with only a very small amount of jitter. As has been noted, this small amount of jitter can be still further reduced, if desired, by employing driving belts of material having even smaller compliance than Mylar belts, for example, stainless steel belts.

Another advantage of the invention is that the recording tape has long life since it is not in contact with a driving capstan.

By way of example, one application of the invention is illustrated in FIG. 6. In FIG. 6, as in FIG. 1, the loop of magnetic tape 10 is shown located in a vertical plane. The invention is particularly useful for frequency spectrum analysis of signals where only a very small amount of tape jitter can be tolerated. In one example of this application of the invention, signals that have been recorded and stored on tape are played back into a recording head 41 (FIG. 6) and the signal is recorded on the magnetic tape 10. For spectrum analysis the signal is taken off the tape 10 by a magneto-optical pick-up device 42 which converts the magnetically recorded signals to light signals which are used for the spectrum analysis. Various suitable magneto-optical pick-up devices are known in the art. Such devices may employ the Kerr magneto-optical effect to rotate the major direction of polarization of the rays of a beam of light reflected from the surface of the magnetic tape carrying the recording or from the surface of a medium containing the magnetic facsimile of the magnetic recording on the tape.

One example of a suitable magneto-optical pick-up device is described in Patent 2,560,430 issued to A. W. Friend on July 10, 1951.

It may be noted that the recording and pick-off heads may be multiple channel heads, since recording several parallel tracks on the tape conserves tape.

In the spectrum analysis application of the invention, the recording head 41 may also function as the erase head since signal recorded on top of a recorded signal erases the recorded signal.

In frequency spectrum analysis it may be desired to record the signal on the tape 10 at a comparatively low speed in real time, or at a much higher speed. In the embodiment described, this higher speed is fifty times the low speed. In certain applications of the invention, the ratio of the higher speed to the lower speed should be an exact unchanging one. Such a constant speed ratio is ensured by the use of the two driving capstans as above described.

For some applications of the invention the pick-up device 42 may be a magnetic pick-up similar to the magnetic recording head 41.

The invention is not limited to driving a closed loop of recording tape. For example, in FIG. 7 the invention is shown as it may be applied to an arrangement where magnetic tape 46 is taken off a supply reel 47, and, after recording or read-out, stored on a take-up reel 48.

The recording tape drive of FIG. 7 is the same as previously described, the tape being driven by rollers 11 and 12, but in this case the tape is not a closed loop. The magnetic tape 46 passes from the supply reel 47, which is servo controlled, over guide rollers 51, 52, 53, 54 and 55, for example, over an air guide 57, over the driving rollers 11 and 12, over an air guide 58, and over guide rollers 61, 62, 63, 64 and 66 to the take-up reel 48 which is servo controlled.

The guide rollers 52, 54 and 62, 64 are on tension arms 55 and 65, respectively, for adjusting the tension of the tape 46. The arms 55 and 65 are pulled upwardly at one end by the springs 71 and 72, respectively.

In using the arrangement of FIG. 7 with a computer, the desired information in binary form is recorded on the tape by a recording head 67, and the tape carrying the recording is stored on the take-up reel 48.

When it is desired to feed the recorded information into a computer, the tape drive is reversed, and the recorded information is fed from a read-out head 68 to the computer. In reversing the tape drive, the drives of the take-up reel and the supply reel are reversed, and the drive of the drive rollers 11 and 12 is reversed. The drive of rollers 11 and 12 is reversed by reversing the direction of rotation of the motor 29. Conventional breaking for controlling intermittent (start-stop) motion of the tape 46 may be provided.

In the particular applications described, the recording tape is described as magnetic tape. The applications are not limited to driving magnetic tape. For example, our drive may be used to drive photographic tape. Also, the capstan-pressure roller feature of the invention may be used to drive any elongated web.

What is claimed is:

1. In a tape drive system having a pair of spaced drive rollers over which the tape is passed, said tape drive system having further means for driving said two rollers at constant speed, the combination comprising,
- a first and second pulley with said first pulley coupled to one of said drive rollers and said second pulley coupled to said other drive roller,
- a belt on said pulleys,
- a capstan positioned adjacent to said belt,
- a pressure roller positioned to force said belt against said capstan when said pressure roller is moved into driving position,
- and means for driving said capstan.

2. The invention according to claim 1 wherein said drive rollers are of the same diameter and wherein said pulleys are of the same diameter.

3. A tape drive comprising
- a first driving roller and a second driving roller, the tape to be driven being passed over and partially wrapped around said first roller and being passed over and partially wrapped around said second roller,
- means for tensioning said tape so that it is pulled into firm contact with said rollers, a belt coupling said first roller to said second roller, and
- belt driving means, including a capstan with which the belt is held in contact, for driving said two rollers at the same peripheral speed whereby the tape between said rollers is driven with substantially no tape stretch.

4. The invention according to claim 3 wherein the belt of said belt driving means is driven by a capstan with which the belt is held in contact by a pressure roller.

5. The invention according to claim 4 wherein means is provided to force said pressure roller against said belt when the pressure roller is in driving position so as to wrap said belt partially around said capstan without pinching said belt between said capstan and said pressure roller.

6. The invention according to claim 3 wherein at least two capstans are positioned in driving relation to the belt of said belt driving means,
- means for driving said capstans at different speeds,
- a pressure roller opposite each of said capstans with the belt located between the capstan and the pressure roller,
- said capstans being out of contact with said belt unless the associated pressure roller is moved into belt driving position,
- and means for selectively moving one of pressure rollers against said belt to force the belt against the associated capstan so that it drives the belt.

7. The invention according to claim 3 wherein said tape is a closed loop of tape, and wherein said tensioning means comprises a tape guide means that is adjustable in position, said tape being run over said drive rollers and then over said guide means.

8. Means for driving a web,
- said means comprising a capstan,
- said web being adjacent to the capstan,
- means for tensioning the web,
- a pressure roller,
- means for forcing said pressure roller against said web when the pressure roller is in driving position so as to wrap said web partially around said capstan without pinching said web between said capstan and said pressure roller.

9. The invention according to claim 8 wherein means is provided for moving said pressure roller either into driving position or out of driving position.

10. Means for driving a web,
- said means comprising a capstan,
- said web being adjacent to the capstan,
- means for driving said capstan,
- a pressure roller cooperatively positioned with respect to said capstan with the web located between the capstan and the pressure roller,
- said capstan being out of driving contact with said web unless the pressure roller is moved into web driving position,
- and means for moving said pressure roller into driving position against the web to force the web against the capstan and wrap the web partially around the capstan without pinching the web between the capstan and the pressure roller.

References Cited

FOREIGN PATENTS

| | | |
|---|---|---|
| 917,309 | 1/1963 | Great Britain. |
| 966,572 | 8/1964 | Great Britain. |
| 592,841 | 5/1959 | Italy. |

ALLEN N. KNOWLES, *Primary Examiner.*